Dec. 3, 1957 P. K. BODGE 2,814,949
MASS FLOW METER
Filed Dec. 14, 1954
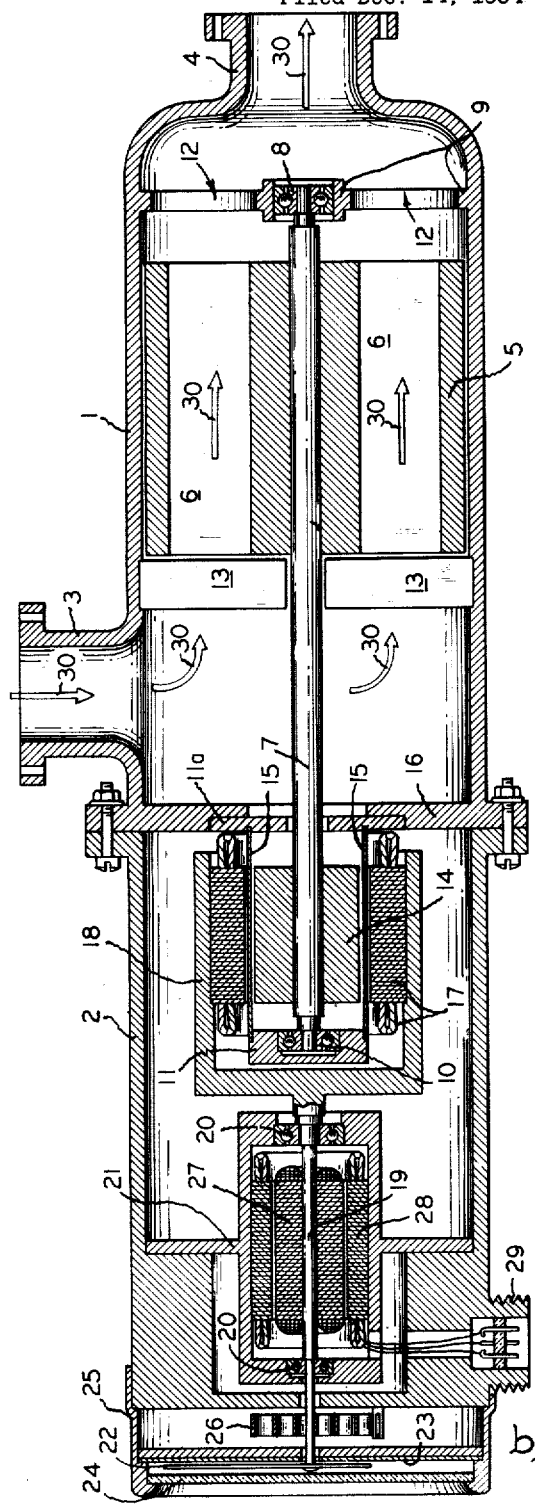
Inventor:
Philip K. Bodge,
by Richard E. Hosley
His Attorney.

United States Patent Office 2,814,949
Patented Dec. 3, 1957

2,814,949

MASS FLOW METER

Philip K. Bodge, Swampscott, Mass., assignor to General Electric Company, a corporation of New York Application December 14, 1954, Serial No. 475,117

2 Claims. (Cl. 73—194)

The present invention relates to fluid flow measuring apparatus and, more particularly, to improved devices for metering fluid flow in terms of its mass.

The rate at which fluid mass is transferred in certain fluid flow circuits has been recognized as a highly significant characteristic. By way of illustration, the mass of fuel which is to be used by an aircraft engine bears an important relationship to fuel heat content, expected flight duration, and fuel loading of the craft, while simple volumetric data concerning the same fuel is of relatively little value because of wide fluctuations of fuel volume with temperature. Also, in chemical industries, the masses of fluids entering into reactions are generally critical, and distributors of fluids as well as their customers are commonly more concerned with their weight or mass than with volume alone. Among the devices which have been long utilized in the measurement of mass flow, there are, for example, the well known differential-pressure gauges cooperating with Venturi tubes, orifices, Pitot tubes, and nozzles. In addition, weight of fluid flow has been sensed by apparatus which imparts uniform angular velocity to the fluid and involves measurement of either the power expended in accelerating the fluid to that velocity or the momentum lost in a reduction of that angular velocity. The present invention relates to flowmeters which are also of the angular momentum type, these devices being particularly versatile, rugged, reliable and accurate.

One of the simpler angular momentum flowmeters, which has been proposed earlier, includes a constant speed motor which rotates a fluid impeller through a spring coupling, the impeller being disposed to impart a constant angular velocity of motion to the fluid flowing in the measurement circuit. Angular deflections of the spring and impeller with reference to the motor drive shaft bear a relationship to mass rate of fluid flow, although measurement of such deflections are particularly difficult to make because all the measuring components rotate at high speed. Stroboscopic lighting of the components may enable direct reading of the flow, or electrical telemetering may reproduce readings at a remote position if slip-ring couplings are used to connect leads with the rotating telemetering transmitter, but there are obvious disadvantages in both such arrangements. In accordance with the present teachings, however, a direct pointer reading may be secured, and a telemetering transmitter may be directly actuated without slip-ring couplings, in a mass flowmeter wherein the measurement is responsive to the power expended in driving a constant speed fluid impeller. The constant speed drive motor which is employed in my improved flowmeter is provided with a dynamometer-type suspension which enables the foregoing advantages to be realized.

Accordingly, it is an object of the present invention to provide an improved mass rate flowmeter of the type wherein measurement is responsive to the power expended in accelerating fluid to a substantially uniform angular velocity.

Further, it is an object to provide an angular-momentum mass flowmeter of a simplified direct-indicating type utilizing a dynamometer motor suspension.

By way of a summary account of one aspect of this invention, I provide a flowmeter which includes a fluid impeller disposed in a fluid path such that it may be rotated to impart a predetermined angular velocity of motion to the fluid, the impeller being coupled with the rotor shaft of a substantially constant-speed motor. The stator structure of the constant-speed motor is mounted outside the fluid path on low-friction bearings, is coupled with a pointer, and is spring-restrained against angular movement. With increased mass flow of fluid through the impeller, the motor torque is enlarged, and the resiliently-restrained motor stator deflects angularly in its bearings to a further extent, whereby the pointer deflects to a position indicating the heightened mass rate of flow.

Although the features of this invention which are believed to be novel are set forth in the appended claims, the details of the invention itself and the further objects and advantages thereof may be most readily comprehended through reference to the following description taken in connection with the accompanying drawing wherein a longitudinal cross-section of an axial-flow mass rate flowmeter is depicted.

The arrangement for practicing this invention which is illustrated in the drawing comprises a generally cylindrical unit having a fluid-flow casing 1 and an attached indicator casing 2 which houses the associated driving, measuring, and indicating components. An inlet port 3 and outlet port 4 couple the fluid-flow casing 1 into a suitable flow path. Coaxially within the flow casing there is positioned a substantially cylindrical fluid impeller 5 which is provided with numerous longitudinal slots or fluid passages separated by partitions 6, the impeller being closely fitted within the casing 1 but physically spaced from the casing 1 such that substantially all of the fluid flow is through the longitudinal fluid passages. Impeller 5 is rotatable about its longitudinal axis, on a rotor shaft 7 which is mounted in bearing 8 of a downstream end bracket 9 and in bearing 10 of an upstream end bracket 11. Passages 12 in the downstream bracket 9 enable unimpeded egress of fluid from the flowmeter, while a number of fluid-straightening vanes 13 affixed to the casing 1 in a proximate upstream relationship to the impeller minimize turbulence of the fluid as it enters the impeller. Rotation of the impeller drive shaft 7 is occasioned by the motor rotor 14 affixed to it, the rotor being disposed within a fluid shield 15 which prohibits entry of fluid from the flow casing 1 into the indicator casing 2. Shield 15 may be of conductive material, for example, which will permit outside motor stator flux to reach the rotor 14, but which will afford a fluid seal by virtue of sealing both to the end bracket 11 and to the annular flange 11a which is, in turn, sealed with end wall 16 of casing 1. Because of the fluid-tightness of casing 1, the separable indicator casing 2 may be wholly detached without interfering with flow in the associated fluid circuit. Further, of course, the fluids under measurement cannot affect the cooperating indicating mechanisms.

The stator core and winding arrangement 17 for the constant-speed drive motor is disposed within casing 2 in a coaxial relation to the rotor 14, the stator support 18 having its shaft 19 mounted in bearings 20 of frame 21 to permit angular movement about an axis collinear with that of the impeller shaft 7. An indicator 22 is fixed with stator shaft 19 to characterize mass rate flow readings by its relationship to a dial 23 viewed through the window 24 of a dial flange 25. A spiral spring 26 is coupled between stator shaft 19 and the fixed indicator casing 2 for the purpose of providing resilient restraint about the stator axis of movement.

As appears more fully hereinafter, the stator shaft 19 and pointer 22 deflect in proportion to the mass rate of flow of fluid through flow casing 1. Telemetering of this measurement to remote positions for control purposes or for actuation of direct-indicating telemetering receivers may be readily accomplished. One suitable telemetering transmitter arrangement comprises a conventional electrical synchro, for example, having its rotor 27 fixed with the movable stator shaft 19 and a stator core and coil assembly 28 fixed with the stationary frame 21. Excitation and signal output leads are brought through a connector 29 which may be coupled with the controlled apparatus and with an appropriate power source. Motor stator 14 may have its electrical excitation leads coupled through the same connector. Electrical connections with the movable synchro rotor 27 and with the motor stator 14 are conveniently realized with current-conducting spirals of the conventional type, not illustrated.

The course of fluid flow through flow casing 1 is traced by the arrows 30. Upon being admitted through inlet port 3, the fluid is straightened in flow by vanes 13, is accelerated to a uniform angular velocity about the axis of shaft 7 by the rotating fluid impeller 5, and is thereafter discharged through outlet port 4. Impeller 5 and motor rotor 14 are caused to rotate at substantially constant speeds by the rotating stator field of motor stator 17, and the required driving power is deflected in the torque between the motor stator and rotor. Accordingly, stator support 18 and support shaft 19 deflect angularly against the resilient restraint of spiral spring 26, the deflection being in proportion to the motor torque. Inasmuch as the motor driving torque is related to the rate at which fluid mass flows through impeller 5, the deflections of the motor stator, synchro rotor, and pointer, are also indicative of the mass rate of fluid flow. Fluid flow in the opposite direction through casing 1 will also be measured in like fashion.

Under zero-flow conditions, a small amount of torque is, nevertheless, reflected upon the restraining spring 26, because of bearing frictions and viscous drags. Dial calibrations of the zero-flow pointer position for fluids within certain ranges of viscosities overcome this influence, or, alternatively, a small suppressed torque may be created in the restraining spring through use of suitable stops. Further, the readings below the zero- or no-flow reading may be useful in that they will serve as annunciators of power failures, whereas in those instruments having the zero flow position as the lowermost pointer position the condition of zero flow cannot be distinguished from the condition of power failure.

While particular embodiments of this invention have been shown and described herein, it will occur to those skilled in the art that various changes and modifications can be accomplished without departing either in spirit or scope from the invention as set forth in the appended claims.

What I claim as new and desire to secure by Letters Patent of the United States is:

1. A mass flowmeter comprising a fluid-tight casing, means for coupling said casing into a fluid flow path, impeller means within said casing for accelerating substantially all the fluid passing through said casing to the same angular velocity, a constant-speed motor rotor within said fluid-tight casing and coupled to rotate said impeller at a substantially constant speed, a constant-speed motor stator mounted outside said fluid-tight casing in coaxial relationship with said rotor, bearing means mounting said stator for angular movement relative to said casing about the axis of rotation of said rotor, yieldable means coupled between said motor stator and casing and yieldably opposing said relative angular movement, first indicating means coupled with said motor stator for angular movement thereby, and second indicating means fixed in relation to said casing, the relative angular orientations of said first and second indicating means characterizing mass rate of fluid flow.

2. A mass flowmeter comprising a first fluid-tight casing, means for coupling said casing into a fluid flow path, rotatable fluid impeller means within said casing disposed to accelerate all the fluid passing through said casing to the same angular velocity, a constant-speed motor rotor disposed within said fluid-tight casing and rotating said impeller, a second casing adapted to be fixed with and detachable from said first casing, a constant-speed motor stator mounted within said second casing for angular movement relative to said second casing, said stator being disposed to be in motor driving relationship to said rotor when said casings are fixed together, means within said second casing for yieldably restraining said angular movement of said motor stator relative to said second casing, first indicating means within said second casing coupled with said motor stator for angular movement thereby, second indicating means within said second casing and fixed in relation to said second casing, the relative angular orientations of said first and second indicating means characterizing mass rate of fluid flow through said first casing.

References Cited in the file of this patent

UNITED STATES PATENTS

| | | |
|---|---|---|
| 1,985,313 | Bryson | Dec. 25, 1934 |
| 2,163,194 | Davis | June 20, 1939 |
| 2,172,095 | White | Sept. 5, 1939 |
| 2,602,330 | Kollsman | July 8, 1952 |
| 2,649,048 | Pezzillo et al. | Aug. 18, 1953 |

FOREIGN PATENTS

| | | |
|---|---|---|
| 691,025 | Great Britain | May 6, 1953 |

OTHER REFERENCES

A publication entitled Mass Flowmeter, on pages 900, 901 of vol. 75, of Mechanical Engineering, pub. Nov. 1953.

UNITED STATES PATENT OFFICE

CERTIFICATE OF CORRECTION

Patent No. 2,814,949                                              December 3, 1957

Philip K. Bodge

It is hereby certified that error appears in the printed specification of the above numbered patent requiring correction and that the said Letters Patent should read as corrected below.

Column 3, line 27, for "deflected" read -- reflected --.

Signed and sealed this 4th day of February 1958.

(SEAL)

Attest:

KARL H. AXLINE

Attesting Officer

ROBERT C. WATSON
Commissioner of Patents